United States Patent [19]

Tsantir et al.

[11] 3,767,423

[45] Oct. 23, 1973

[54] LOW CALORIE BREAD
[75] Inventors: Kostas Tsantir, Minneapolis; Roger A. Gorman, Hopkins, both of Minn.
[73] Assignee: The Pillsbury Company, Minneapolis, Minn.
[22] Filed: Feb. 3, 1971
[21] Appl. No.: 112,198

[52] U.S. Cl..................... 426/62, 426/804, 426/152, 426/205
[51] Int. Cl.... A21d 13/06, A21d 13/04, A21d 2/36
[58] Field of Search...................... 99/90 S, 90 R, 94

[56] References Cited
UNITED STATES PATENTS
3,348,951  10/1967  Evans............................. 99/90 R X
3,573,061  3/1971  Glabe et al. ..................... 99/90 S
3,574,634  4/1971  Singer ............................. 99/90 R X Primary Examiner—A. Louis Monacell
Assistant Examiner—James Robert Hoffman
Attorney—Ronald E. Lund, James V. Harmon and Michael D. Ellwein

[57] ABSTRACT

A low calorie bread is prepared by employing as a replacement of a portion of the conventional dough ingredients, a mixture of finely divided edible hulls of vegetable origin comprising a mixture of rice hulls and soy bean hulls.

11 Claims, 1 Drawing Figure

BREAD PERFORMANCE AT DIFFERENT HULL LEVELS & COMPOSITIONS*

COMPOSITION ILLUSTRATED

| | | | |
|---|---|---|---|
| Flour + Hulls | 68.88% | | |
| Gluten | 13.12% | | |
| Sugar | 8.0% | | |
| | | Emulsifer | 2.0 |
| Minor Dry Ingredients | 10.00% | Yeast | 4.0 |
| | | Yeast food | .5 |
| | | Salt | 2.5 |
| | | Color | .25 |
| | | Sodium diacetate | .75 |
| | 100.00% | | |
| Water | 75.00% of Dry Ingredients | | |

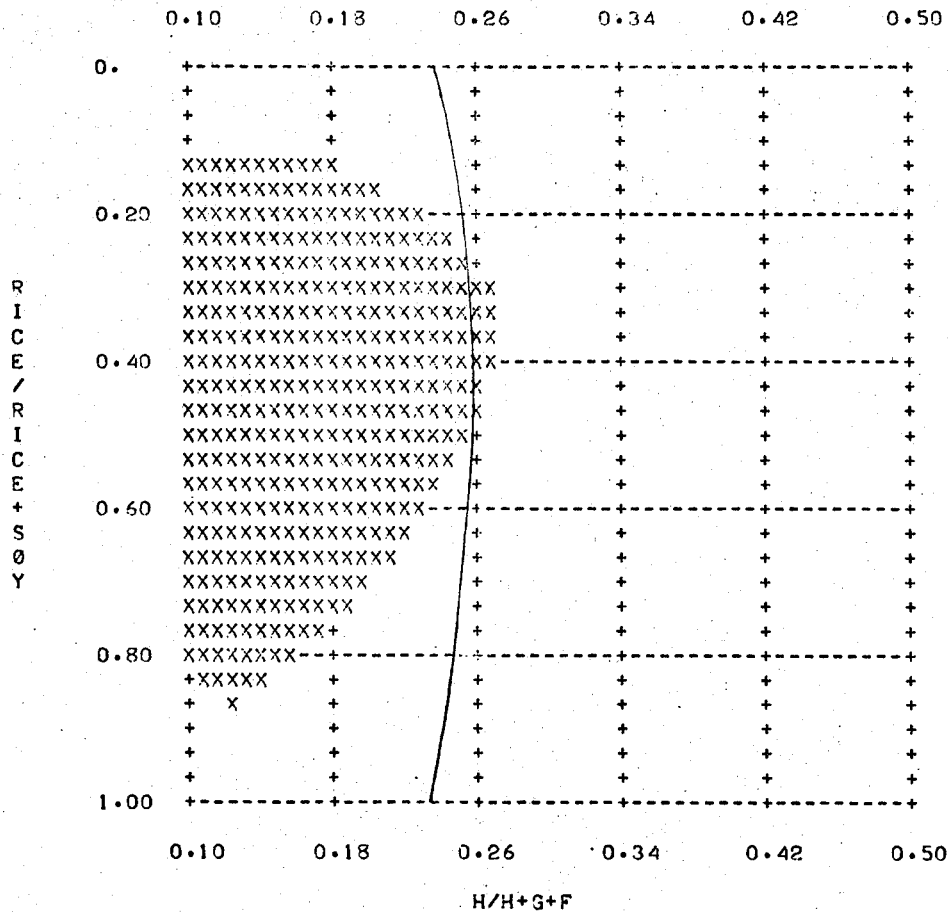

H/H+G+F

*The X'd area indicates performance at levels set in Table I (Hedonic value is 5-9).

INVENTORS
KOSTAS TSANTIR,
ROGER A. GORMAN
BY
ATTORNEY

LOW CALORIE BREAD

FIELD OF THE INVENTION

The present invention relates to food products and more particularly to a low calorie bread. The term "bread" as used herein is intended to refer to breads broadly with reference to the product commonly and generally known as bread by the layman including specialty and variety breads.

BACKGROUND OF THE INVENTION

Among the numerous non-assimilated carbohydrate materials proposed in food formulations such as low calorie bread is purified cellulose that has been subjected to acid hydrolysis as described in U.S. Pat. No. 3,023,104. The material described in the patent is believed to be identical with the product now being sold under the trademark Avicel by the FMC Corporation, American Viscose Division of Philadelphia, Pennsylvania. Avicel, an alphacellulose material, has been tried experimentally in making bread but is quite expensive. In addition, Avicel has a tremendous absorbing capacity for water Moreover, if enough Avicel is used to produce a 25 percent calorie reduction, a commercially satisfactory finished product cannot be produced using standard dough formulations or any dough formula of which we are aware.

U.S. Pat. No. 3,348,951 describes the production of dietetic baking products including bread in which ground nut protein or wheat bran is used to partially or completely replace starch. Ground nut protein is expensive and wheat bran contains a good deal of nutritive material. Accordingly, its calorie lowering capabilities are limited.

Applicant is aware that other non-nutritive food substances such as cellulose, rice hulls, oat hulls, corn cobs, bean hulls, etc. have been proposed for use separately but not in conjunction with one another in making biscuits or crackers. Biscuits and crackers are, however, hard and usually friable. Accordingly, performance requirements are relatively easy to meet. Moreover, gas development and expansion of the dough is a relatively minor factor. In the case of bread, on the other hand, a smooth, light, and resilient texture is required. The volume must be high and the grain structure even. In addition, each loaf must retain just the proper resiliency and gas-holding ability while expanding during proofing and baking. These results cannot be achieved using prior formulations.

OBJECTS OF THE INVENTION

The present invention has among its objects the provision of an improved low calorie bread having the following characteristics and advantages: a) a tender breadlike eating consistency, b) the presence of non-nutritive edible material in amounts great enough to reduce the calorie content of the bread by 10 percent or more and preferably by more than 25 percent, c) an ability to be manufactured using standard bakery procedure and to remain fresh during shipment and storage to retail outlets at least as well as conventional bread, d) a hedonic score when subjected to standard taste panel tests somewhat more favorable than a neutral reaction, e) the provision of a highly nutritional low calorie bread product which is low in cost and has the pleasing aroma, flavor and texture characteristic of bread.

SUMMARY OF THE INVENTION

Briefly, the present invention provides a bread product having the aroma and tender eating characteristics of bread and the capability of being manufactured and distributed in the same manner as conventional bread as well as a calorie reduction compared with conventional bread of up to 10 percent and preferably above 25 percent. The bread product is composed of flour, sugar, water, leavening and optionally, flavoring and coloring and a mixture of finely divided rice hulls and finely divided soybean hulls. For each 10 parts of flour, sugar is present in the amount of about 0.9 to 3.6 parts, hulls are present in an amount up to about 20 parts, leavening such as yeast is present in an amount sufficient to provide adequate dough expansion and optionally a source of edible protein, e.g. gluten is present in an amount up to about 10.6 parts. In a preferred form of the invention, rice hulls and soy bean hulls are used in about equal amounts.

DESCRIPTION OF THE DRAWINGS

The FIGURE is a chart in which the ratio of rice hulls to soy bean hulls is plotted against the ratio of hulls to hulls plus gluten plus flour wherein the area shown by X's indicates the area of best performance.

DESCRIPTION OF THE PREFERRED EMBODIMENT

The major ingredients present in the compositions embodying the present invention are flour, finely ground soybean and rice hulls, sugar, water, and leavening. A great many minor ingredients can be employed to provide optimum performance and to impart special characteristics. These include flavors, egg yolk for tenerizing the dough, emulsifiers which produce tenderness, gluten for the purpose of strengthening the dough and making it more resilient, yeast food, an antimycotic agent such as sodium diacetate and color among others. Color, flavor and egg yolk are used in conventional amounts, emulsifiers such as a monoglyceride bread emulsifier is used in the amount of about 4 parts for each 100 parts of flour and gluten is used in amounts from zero to about 10.6 parts for each 10 parts of flour but preferably from about 2.5 parts to about 3.5 parts for each 10 parts of flour.

In a typical formulation including 100 parts of flour, the minor ingredients might consist of 8 parts yeast, 1 part yeast food, 5 parts salt, 4 parts of mono-glyceride bread emulsifier, 1.5 parts sodium diacetate and .4 parts color. In general, the use of increasing amounts of emulsifier reduces the amount of gluten required.

Referring now to a more detailed consideration of the major ingredients employed in the composition, the assumption will be made for the purposes of this specification that all quantities presented herein except water are expressed in parts by weight on the basis of 10 parts by weight of flour.

First, with reference to sugar, it has been found that from about 0.9 to about 3.6 parts sugar can be used for each 10 parts of flour but preferably from about 1.6 to about 2.0 parts is used. If too little sugar is employed, the yeast action may be inhibited and the bread will suffer from poor volume. If too much is employed, the taste may be too sweet and the caloric content excessive. The function of the sugar is primarily for yeast action and flavoring and thus allows more hulls to be added.

There is, of course, no lower limit in the amount of hulls that can be employed in accordance with the invention since any amount of added hulls has a small but measurable effect in reducing the caloric content of the bread. However, based upon dietary requirements as well as nutritional requirements that have been carefully gathered from nutritional experts consulted concerning the formulation, caloric content reductions of over 10 percent and preferably above 25 percent are preferred. We use from about 1.2 to about 4.5 parts hulls for a bread having a 25 percent calorie reduction and up to about 20 parts or more but preferably up to about 12 parts hulls for each 10 parts of flour. The greatest effect noticed by the addition of hulls is the reduction in calorie content. The addition of hulls does, however, reduce favorable volume, grain, texture and hedonic scores and accordingly, no greater amount is used than is necessary to provide the requisite calorie reduction.

It is preferred that both types of hulls be present. If 100 percent rice hulls are employed, performance with regard to bread volume and grain is usually very good but the bread sometimes exhibits a gritty character in the mouth. If 100 percent soy bean hulls are employed, the bread may have a beany flavor. Additionally, the dough absorbs and retains a higher percentage of water and requires more gluten for a given quantity of flour. Furthermore, the use of soy bean hulls has a tendency to depress the volume of the bread.

The ratio of rice hulls to soy bean hulls can vary from about 2 percent to 98 percent respectively or from about 98 percent to 2 percent respectively when a relatively minor caloric reduction is to be achieved, e.g. 15 percent. When a higher caloric reduction is desired, e.g. 20 percent or more the ratio should be from about 20 percent to 80 percent to 80 percent to 20 percent respectively. In general, the best results are usually obtained with about equal parts of rice hulls and soy bean hulls. As can be seen by reference to the figure, the optimum ratio of rice hulls to rice hulls plus soy hulls depicted by the X'd area in the figure is between about 0.1 and 0.85.

The rice and soy bean hulls are dried, cleaned and ground into a size similar to that of flour, for example from about 5 to 160 microns. They can be ground to an average particle size below about 20 microns and are typically ground to an average particle size of about 5 to 25 microns in diameter. The particles preferably have an average diameter below 10 microns.

The present invention allows bread formulations to be made which reduce the calorie content from only a small amount to as much as 35 percent compared with the same formulations not utilizing the invention depending upon the amount of hulls that are used and in part upon the relative amounts of sugar and other constituents.

An important aspect of the present invention is the fact that it can be compounded using conventional methods, for example the straight dough or sponge process. For every 100 parts of solids in the dough, there is usually about 65 to 85 and preferably from 70 to 80 parts of water in the dough before baking. The final moisture content of the bread is about the same as a conventional bread. The amount of water used in the composition before baking has a great effect on achieving a favorable taste panel test. If too little is used, the finished product tends to be hard, dry or have poor volume. If too much is used, the finished product may be too moist or have a poor structure, volume or hedonic score.

While the quantities of components present in the composition have been described above, it has also been found that to obtain the best volume, texture, symmetry, break, grain description and aroma as well as the best eating qualities, the relative proportions of the ingredients as well as their quantities with relationship to the amount of flour are significant. Accordingly, the effect of changing the most significant of these relationships will be described hereinbelow for the sake of completeness. It should be understood that these proportions apply in the specific application of the invention to the formulation of a high volume bread containing the following ingredients: flour, gluten, a combination of finely divided rice hulls and soy hulls, sugar, a monoglyceride emulsifier, yeast leavening, water and optionally color and flavor.

In tests conducted to measure the effect of changing the ratios of major ingredients with respect to one another, compositions embodying the invention were prepared in which the proportions of the major ingredients were varied. These compositions were then evaluated and scored in terms of the criteria listed hereinbelow in Table I which designates acceptable levels for each criterion as adjudged by our standards. For example, the specific volume should be between 2.8 and 6 cc's per gram and the symmetry should be between 3 and 5, etc.

TABLE I

MEASUREMENTS TO DEFINE ACCEPTABLE LOW CALORIE BREAD

Volume — 1500 cc–3000 cc/loaf
Specific Volume — 2.8–6.0 cc/gm

| | | | |
|---|---|---|---|
| Symmetry 3 to 5 | Bold is 5 | Slightly Bold is 3 | Weak is 1 |
| Break & Shred 3 to 5 | Even is 5 | Ragged is 3 | None is 1 |
| Grain Description 3 to 5 | Fine is 5 | Medium is 3 | Coarse is 1 |
| Grain Uniformity 3 to 5 | Uniform is 5 | Slightly Uniform is 3 | Uneven is 1 |
| Texture (Hardness) 3 to 5 | Soft is 5 | Slightly Hard is 3 | Hard is 1 |
| Texture (Elasticity) 3 to 5 | Elastic is 5 | Slightly Plastic is 3 | Plastic is 1 |

Aroma — 4.5 to 8 on an 8-point scale in which 8 is best
Hedonic (Overall like or dislike by 60 member panel) — 3 to 9 and preferably five to nine on a nine-point scale in which 9 is best & 3 is neutral
Grittiness — 1 to 2.5 on a six-point scale in which 1 is best & 6 is poorest
Flavor Quality — 4.5 to 8 on a seven-point scale from 2–8 in which 8 is best & 2 is poorest Using the ingredients listed immediately above, the following polynomials were generated from a response surface experiment in which the relative proportions of flour, hulls, gluten, sugar and water were varied. The particular performance criterion was then measured for each composition and the polynomial for that criterion was then derived which would fit the panel results for that criterion by the method of least squares. The polynomials for the criteria used by us to define an acceptable bread are as follows:

VOLUME (in cc./loaf — 20 oz. of dough) = −9175.128 − 1068.854 H + 6718.645 G + 5160.707 R + 251.375 W − 7622.110 H² − 5.722 S² − 594.534 R² − 1.445 W² − 2430.527 HG + 321.475 HS − 2222.202 GR − 34.721 GW − 52.815 SR − 41.249 RW SPECIFIC VOLUME (in cc./g.) −14.059 − 6.278 H + 8.701 G + 8.261 R + 0.418 W − 14.768 H² − 0.012 S² − 1.140 R² − 0.003 W² − 6.597 HG + 0.671 HS + 0.055 HW − 4.083 GR SYMMETRY = −41.766 − 20.001 H + 35.271 G + 1.448 S + 16.593 R + 0.991 W − 26.562 H² − 20.575 G² − 0.038 S² − 2.500 R² − 0.006 W² + 0.547 HS + 0.344 HW − 0.434 GS − 6.944 GR − 0.208 GW − 0.188 SR − 0.013 SW − 0.138 RW BREAK & SHRED = −13.148 − 15.324 H + 7.317 R + 0.442 W − 15.807 H² + 0.988 G² − 0.014 S² − 1.029 R² − 0.003 W² + 0.650 HS + 3.75 HR + 0.156 HW − 3.859 GR + 0.081 GW − 0.075 RW GRAIN DESCRIPTION = −21.781 − 17.361 H + 11.036 R + 0.666 W − 14.541 H² − 0.015 S² − 0.910 R² − 0.005 W² + 0.7997 HS + 0.1875 HW − 3.5235 GR + 0.0849 GW − 0.1201 SR − 0.1 RW GRAIN UNIFORMITY = −45.974 − 14.0635 H + 24.3626 G + 1.423 S + 15.9474 R + 1.1218 W − 34.3743 H² − 25.7194 G² − 0.0482 S² − 3.4166 R² − 0.0071 W² + 10.4168 HG + 0.4688 HS + 1.2501 HR + .3125 HW − 6.9444 GR − 0.1389 GW − 0.0625 SR − 0.0109 SW − 0.1375 RW TEXTURE (HARDNESS) = −42.4985 − 17.8789 H + 0.7953 S + 9.8571 R + 1.1574 W − 21.5776 H² − 6.5858 G² − 0.0253 S² − 1.1191 R² − 0.0076 W² − 6.7013 HG + 0.8594 HS + 0.25 HW − 4.1018 GR + 0.1632 GW − 0.0094 SW − 0.0875 RW TEXTURE (ELASTICITY) = −43.4921 + 22.348 G + 0.8446 S + 14.8056 R + 1.03496 W − 13.218 H² − 8.3080 G² − 0.0181 S² − 0.9934 R² − 0.0058 W² − 4.8611 GR − 0.1736 GW − 0.0078 SW − 0.15 RW AROMA = 5.9891 − 0.051 S + 1.127 R + 0.001 S² − 1.0997 R² − 0.00004 W² − 0.0283 HS − 1.9671 HR HEDONIC = 7.6466 − 20.8533 H − 8.82899 G + 0.12705 S − 4.44367 H² − 23.3019 G² − 0.00135 S² − 3.14526 R² − 0.0007 W² − 0.15963 HS + 3.20807 HR + 0.26428 HW − 2.95073 GR + 0.23276 GW + 0.02226 RW GRITTINESS = 5.49758 + 2.59786 H + 13.97707 G − 0.02757 S − 0.13893 W + 3.33055 H² + 5.86226 G² + 0.00026 S² + 0.0011 W² − 6.77084 HG + 0.04314 HS − 1.22737 HR + 1.08023 GR − 0.21241 GW + 0.00631 RW FLAVOR QUALITY = 6.48288 − 17.03986 H + 0.04795 S + 1.21305 R − 0.00092 S² − 1.92648 R² − 0.00029 W² − 0.0608 HS + 0.19657 HR + 0.00032 SW CALORIES/GRAM = 3.325 − 2.486 H + 0.56 G − 0.014 W + 0.419 H² − 0.641 G² + 0.001 S² − 0.073 R² − 0.406 HR + 0.01 HW − 0.902 GR + 0.002 RW wherein the variables are defined as follows in parts by weight:

H = [Hulls/(Hulls + Gluten + Flour)]
G = [Gluten/(Hulls + Gluten + Flour)]
S = Sugar as a percentage of the mix composed of the following ingredients: sugar, hulls, gluten, flour, and 10 percent minor ingredients
R = [Rice Hulls/(Rice Hulls + Soy Hulls)]
W = Water as a percentage by weight of the dry mix.

The contours produced by the preceding equations can be overlaid to give an acceptable region as set forth above and as shown in the figure by the area indicated by X's. To the left of the dark line through the figure are the formulas that have less than a 25 percent calorie reduction over the same formulation without hulls. The area to the right of the line designates formulations having greater than a 25 percent reduction in caloric content. It will be seen by reference to the figure that when less calorie reduction is required that a greater variation is permitted in the ratio of rice hulls to soy hulls. It can also be seen that with the highest calorie reduction, the amounts of soy hulls and rice hulls should be about equal for optimum performance.

From the foregoing discussion, it can be seen that the present invention has a great many advantages and makes possible greatly improved results in a number of areas. Thus, while the diet bread currently being sold commercially offers a caloric reduction compared with conventional white bread of from about 6 to 8 percent at the most, the present invention provides a calorie reduction well in excess of this amount and is especially useful at levels of calorie reduction of over 10 percent and in the case of many typical formulations of over 25 percent. Moreover, the compounding and baking procedure is compatible with conventional bakery practice.

Accordingly, one of the major advantages of the invention is the production of a satisfactory bread from the standpoint of applicable criteria mentioned hereinabove while at the same time providing a substantial calorie reduction. With regard to the composition of the non-nutritive hulls fraction, it was discovered that it is possible to produce a bread which is satisfactory from the standpoint of performance criteria without rice hulls being present provided the H ratio to below 0.16 but under these circumstances little calorie reduction would be achieved. As the proportion of rice to soy is increased, it can be seen that good performance can be obtained with higher levels of hulls being present and accordingly greater calorie reduction can be accomplished. When the ratio of rice to rice and soy is increased above about 0.5 or 0.6 the amount of hulls that can be used and yet obtain a satisfactory bread decreases.

Also, in accordance with the present invention, relatively high levels of calorie reduction, for example over 25 percent can be obtained with gluten (G) present at its best ratio which is about 0.14 to about 0.18 with water in its optimum range of from about 72 to 79 percent of the dry mix. Of course, it is also possible with the present invention to achieve relatively low levels of calorie reduction for example 8 percent in which case the rice to soy and rice ratio can be varied much more widely for example from 0.1 to 0.9. This can be readily seen by reference again to the figure which illustrates that ratios of rice to rice and soy ranging from 0.2 to 0.7 provide a calorie reduction of about 20 percent whereas at levels around 25 percent the ratio of rice to rice and soy should be around 0.2 to 0.5 for optimum performance.

With reference again to the effect of changing the ratio of the several major ingredients it was found that increasing the H value, i.e. [H/(H + G + F)] decreased the overall appeal of the bread as indicated by the hedonic scores achieved by a standard taste panel. It is also detrimental to aroma unless only soy hulls are present in which case increasing hull content does not reduce the aroma preference. Increasing the hull content also reduces flavor and decreases volume, reduces symmetry, harms the grain especially when the ratio of [H/(H + G + F)] is between 0.3 to 0.5 but a softer texture is obtained with larger [H/(H + G + F)] ratios.

From the standpoint of overall appeal the middle level of gluten is better liked than either extreme. Using the general formulation set forth in the figure, the best ratio of gluten to hulls plus gluten plus flour was from about 0.14 to about 0.28 with a peak at 0.17. It was also discovered that when gluten is present, the deterioration of break and shred is entirely a function of the (H) ratio and is not dependent on the rice to soy ratio. It was found to help the grain of the bread at a water level of about 75 percent of the dry mix and to produce a more uniform grain. As mentioned above, gluten is not essential at the lower calorie reduction level.

The overall acceptance of the bread is less when using the formula with all soy hulls or all rice hulls and particularly when using all rice hulls, especially when the formula has a low level of sugar and a high level of gluten. It was found that high levels of sugar allows more rice hulls to be used without losing preference. While rice hulls are perceived to be more gritty than soy hulls, bread will have a much larger volume with rice hulls than with soy hulls, especially at low water levels. On the other hand, soy hulls have a better flavor quality than rice hulls but rice hulls tend to harm the grain less than the soy hulls.

At the middle level of water, about 75 percent of the dry mix, high and low sugar levels are better than the middle levels of sugar. The sugar is especially valuable in allowing more rice hulls to be used without losing preference but sugar if present in the amount of about 8 percent of the dry mix decreases volume and in increasing amounts reduces the symmetry. Relatively high amounts of sugar also are detrimental to the grain description and the grain uniformity as well as giving the bread too soft a texture if large amounts are used but will make the bread more elastic if water is present in the amount of from about 75 to 80 percent.

As mentioned hereinabove, the best water level is about 70 to 80 percent of the dry mix. Using 85 percent water was found detrimental to the overall acceptance of the bread and a poorer aroma is obtained with a high water level but at low water levels, for example 65 percent, a better symmetry is obtained with rice hulls than with soy hulls. It was also found that when water is between 75 to 85 percent on the basis of the dry mix, a high sugar level, e.g. 12 percent is detrimental to the break and shred characteristics. A high water level also tends to harm the grain but makes the finished product more elastic.

The invention will be better understood by reference to the following examples wherein values are expressed in parts by weight with the exception of water which is expressed as a percentage of the dry mix ingredients.

All of the dry ingredients were mixed in a Hobart mixer. Then 75 parts of water were added per 100 parts of dry ingredients. Mixing was continued until there was gluten development, about 10 to 15 minutes.

Then the dough was put in a fermentation cabinet at 85° to 90° F. and 82 to 84 per cent relative humidity TABLE II – Parts by weight

| Ingredient | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Sugar | 9.71 | 35.29 | 14.04 | 30.53 | 16.67 | 13.11 | 11.59 | 13.70 | 17.39 | 17.77 | 12.90 | 17.13 | 15.24 | 13.56 | 11.19 | 16.84 | 13.56 | 13.56 | 16.82 |
| Gluten | 46.11 | 60.59 | 29.47 | 93.89 | 39.58 | 13.11 | 0 | 106.16 | 42.61 | 42.22 | 19.03 | 28.05 | 34.29 | 19.49 | 3.22 | 55.37 | 25.08 | 25.08 | 27.59 |
| Rice hulls | 25.05 | 27.53 | 5.75 | 47.63 | 0 | 21.31 | 15.07 | 35.34 | 14.26 | 16.00 | 5.29 | 19.01 | 0 | 15.59 | 9.17 | 6.91 | 5.56 | 5.56 | 17.93 |
| Soy hulls | 37.57 | 41.29 | 8.63 | 71.45 | 31.25 | 0 | 3.77 | 53.01 | 21.39 | 24.00 | 7.94 | 28.52 | 21.9 | 3.90 | 2.29 | 10.47 | 8.34 | 8.34 | 26.89 |
| Flour | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| Emulsifier | 4.85 | 5.88 | 3.51 | 7.63 | 4.17 | 3.28 | 2.90 | 6.85 | 4.35 | 4.44 | 3.23 | 4.28 | 3.80 | 3.39 | 2.80 | 4.21 | 3.39 | 3.39 | 4.20 |
| Yeast | 9.71 | 11.76 | 7.02 | 15.27 | 8.33 | 6.56 | 5.80 | 13.70 | 8.70 | 8.89 | 6.45 | 8.57 | 7.68 | 6.78 | 5.59 | 8.42 | 6.78 | 6.78 | 8.41 |
| Yeast food | 1.21 | 1.47 | .87 | 1.91 | 1.04 | .82 | .72 | 1.71 | 1.09 | 1.11 | .81 | 1.07 | .95 | .85 | .70 | 1.05 | .85 | .85 | 1.05 |
| Salt | 6.07 | 7.35 | 4.39 | 9.54 | 5.21 | 4.10 | 3.62 | 8.56 | 5.43 | 5.56 | 4.03 | 5.35 | 4.76 | 4.24 | 3.50 | 5.26 | 4.24 | 4.24 | 5.26 |
| Sodium diacetate | 1.82 | 2.21 | 1.32 | 2.86 | 1.56 | 1.23 | 1.09 | 2.57 | 1.63 | 1.67 | 1.21 | 1.61 | 1.43 | 1.27 | 1.05 | 1.58 | 1.27 | 1.27 | 1.58 |
| Color | .61 | .74 | .44 | .95 | .52 | .41 | .36 | .86 | .54 | .56 | .40 | .535 | .48 | .42 | .35 | .53 | .42 | .42 | .53 |
| Water (percent of dry mix) | 75.00 | 75.00 | 75.00 | 75.00 | 75.00 | 75.00 | 75.00 | 75.00 | 65.00 | 85.00 | 75.00 | 75.00 | 75.00 | 75.00 | 75.00 | 75.00 | 65.00 | 81.00 | 75.00 | for one hour. It was then molded and placed in the proof cabinet and allowed to rise to a 4 ½ in. template. Then it was placed in an oven for 25 to 30 minutes at 415° F. to bake the low calorie bread. The above procedure is the straight dough procedure. The invention can also be applied if desired to the sponge and dough method of making bread.

We claim:

1. A composition for use in making a low calorie bread comprising 10 parts flour, about 0.9 to 3.6 parts of sugar, a quantity of finely divided rice hulls and finely divided bean hulls in an amount up to about 20 parts and sufficient that bread product produced therefrom has a reduced caloric content compared to conventional bread, the ratio of rice hulls to rice hulls plus bean hulls in parts by weight being between about 0.1 and 0.85 a leavening present in an amount sufficient to provide adequate dough expansion and sufficient water to make up a dough.

2. The composition of claim 1 wherein the bean hulls comprise soy bean hulls.

3. The composition of claim 1 wherein water is present in the amount of from about 65 to 85% of the dry mix.

4. The composition of claim 1 wherein gluten is present in an amount up to about 10.6 parts for each 10 parts of flour.

5. The composition of claim 1 wherein the bean hulls are soy bean hulls and the ratio of soy hulls to rice hulls and soy hulls is between about 0.2 and about 0.8.

6. The composition of claim 5 wherein the hulls are ground to a particle size similar to that of flour.

7. A dry mix for use in mating low calorie bread product, said dry mix comprising: 10 parts by weight of farinaceous material, about 0.9 to 3.6 parts sugar, finely divided rice hulls and finely divided soy bean hulls present in an amount up to about 12 parts and sufficient that a bread product produced therefrom has a reduced caloric content compared to conventional bread, the ratio of rice hulls to rice hulls plus bean hulls in parts by weight being between about 0.1 and 0.85 and leavening present in an amount sufficient to provide adequate dough expansion.

8. The composition of claim 7 wherein the quantities of rice hulls and soy bean hulls are about equal.

9. The composition according to claim 7 wherein a minor amount of a bread emulsifier is present in a sufficient quantity to improve the tenderness of the bread, gluten is present in the amount of 2.5 to about 3.5 parts, from about 1.6 to about 2.0 parts of sugar is present and the leavening comprises yeast.

10. A baked low calorie bread product comprising: 10 parts by weight of farinaceous material, a minor amount of sugar sufficient to provide an effective level of sweetness, finely divided rice hulls and finely divided soy bean hulls present in an amount up to about 12 parts and sufficient that the bread product has a reduced caloric content compared to conventional bread, the ratio of rice hulls to rice hulls plus bean hulls in parts by weight being between about 0.1 and 0.85.

11. The composition according to claim 10 wherein a minor amount of a bread emulsifier is present in a sufficient quantity to improve the tenderness of the bread, gluten is present in the amount of 2.5 to about 3.5 parts, a minor amount of sugar is present.

* * * * *